US012651853B2

(12) United States Patent
Wittpahl

(10) Patent No.: US 12,651,853 B2
(45) Date of Patent: Jun. 9, 2026

(54) PLUG CONNECTOR HAVING A BRIDGING FUNCTION

(71) Applicant: HARTING ELECTRIC STIFTUNG & CO. KG, Espelkamp (DE)

(72) Inventor: Markus Wittpahl, Hüllhorst (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 350 days.

(21) Appl. No.: 18/563,586

(22) PCT Filed: May 13, 2022

(86) PCT No.: PCT/DE2022/100360

§ 371 (c)(1),
(2) Date: Nov. 22, 2023

(87) PCT Pub. No.: WO2022/247985

PCT Pub. Date: Dec. 1, 2022

(65) Prior Publication Data

US 2024/0243490 A1 Jul. 18, 2024

(30) Foreign Application Priority Data

May 26, 2021 (DE) ..................... 10 2021 113 555.9

(51) Int. Cl.
*H01R 4/60* (2006.01)
*H01R 4/18* (2006.01)
(Continued)

(52) U.S. Cl.
CPC ............... *H01R 4/60* (2013.01); *H01R 4/183* (2013.01); *H01R 13/111* (2013.01); *H01R 13/415* (2013.01); *H01R 13/506* (2013.01)

(58) Field of Classification Search
CPC ........ H01R 4/60; H01R 4/183; H01R 13/111; H01R 13/415; H01R 13/506; H01R 13/7032; H01R 31/08; H01R 31/085
(Continued)

(56) References Cited

U.S. PATENT DOCUMENTS 3,725,843 A * 4/1973 Johnson ............. H01R 12/7088 361/801
4,456,317 A * 6/1984 McCleerey ............ H01R 31/08 439/507
(Continued)

FOREIGN PATENT DOCUMENTS

CN 104701692 A 6/2015
DE 202007017892 U1 3/2008
(Continued)

OTHER PUBLICATIONS

International Preliminary Report on Patentability, dated Nov. 21, 2023, for International Patent Application No. PCT/DE2022/100360. (8 pages).
(Continued)

*Primary Examiner* — Gary F Paumen
(74) *Attorney, Agent, or Firm* — Seed Intellectual Property Law Group LLP

(57) ABSTRACT

A plug connector is provided having a plug-in side, a connection side, and a plug-in direction, which extends from the connection side to the plug-in side, towards a mating connector or a socket, the plug connector having a contact insert and at least four contact elements, the contact elements being positioned in the contact insert in dedicated receiving regions, the plug connector having at least two bridging elements for the electrical connection of in each
(Continued)

case at least two contact elements, the bridging elements being positioned one behind the other as viewed in the plug-in direction.

9 Claims, 3 Drawing Sheets

(51) Int. Cl.
*H01R 13/11* (2006.01)
*H01R 13/415* (2006.01)
*H01R 13/506* (2006.01)

(58) Field of Classification Search
USPC .................................................. 439/701, 507
See application file for complete search history.

(56) References Cited

U.S. PATENT DOCUMENTS

| | | | | |
|---|---|---|---|---|
| 5,007,888 A | | 4/1991 | Goutiere | |
| 5,707,254 A | * | 1/1998 | Chishima ........... | H01R 13/4223 439/721 |
| 6,368,128 B1 | | 4/2002 | Backer et al. | |
| 8,784,127 B2 | * | 7/2014 | Bashkin ........... | H01R 13/62955 439/372 |
| 8,979,577 B2 | * | 3/2015 | Wu ...................... | H01R 9/2491 439/507 |
| 2005/0003702 A1 | * | 1/2005 | Obata .................... | H01R 29/00 439/507 |
| 2019/0109417 A1 | | 4/2019 | Tsukamoto et al. | |
| 2021/0210887 A1 | | 7/2021 | Kliever | |

FOREIGN PATENT DOCUMENTS

| | | |
|---|---|---|
| DE | 102018111734 B3 | 6/2019 |
| EP | 1065760 A1 | 1/2001 |
| JP | H09306617 A | 11/1997 |
| JP | H103972 A | 1/1998 |

OTHER PUBLICATIONS

International Search Report and Written Opinion, mailed Aug. 16, 2022, for International Patent Application No. PCT/DE2022/100360. (13 pages) (with English translation of International Search Report).

Office Action, dated Feb. 14, 2022, for German Patent Application No. 10 2021 113 2 555.9 (7 pages).

* cited by examiner

PLUG CONNECTOR HAVING A BRIDGING FUNCTION

BACKGROUND

Technical Field

The present disclosure relates to a plug connector.

Such plug connectors are needed when the currents of individual conductors of a multi-strand cable must be distributed within the plug connector. This is the case in so-called data centers, for example. Here, the so-called neutral conductor of the connected cable must be distributed within a data rack to the individual server units of the data rack.

Description of the Related Art

The document DE 20 2007 017 892 U1 discloses a contact insert for industrial plug connectors having a PE plate.

If it is necessary to bridge individual conductors for specific applications, the conductors have until now been bridged inside the plug connector housing. So-called conductor terminals, for example, are used for this. However, sufficient space must be present and a correspondingly sized housing must be selected for this. Bridging inside the housing entails a large hazard potential. If the mechanical connection of the bridged conductors does not hold, current-carrying conductors can reach the plug connector housing.

The German Patent and Trade Mark Office has searched the following prior art in the priority application for the present application: JPH09-306617 A, JPH10-3972 A, CN 104 701 692 A and U.S. Pat. No. 5,007,888 A.

BRIEF SUMMARY

Embodiments of the present disclosure provide a plug connector that is safe, has a compact structure, and can be connected conveniently to a cable.

The plug connector described herein includes a plug-in side and a connection side. On the connection side, the individual conductors of a multi-strand cable are connected conductively to the respective contact elements arranged in receiving regions provided in a contact insert. The plug-in side of the plug connector is guided to a mating connector or a socket for electrical contacting. Accordingly, the plug-in direction or the plug-in direction vector of the plug connector runs from the connection side to the plug-in side.

The plug connector has at least four contact elements, which, as already described above, are arranged in receiving regions in the contact insert.

The plug connector has at least two bridging elements, which are provided for the electrical connection of at least two contact elements each. The bridging elements are arranged one behind the other as viewed in the plug-in direction (SR).

In some embodiments, the contact insert has at least two lateral recesses, into each of which a bridging element can be inserted or received. As a result, different bridging elements can be used, and the plug connector can be customized in terms of bridging technology.

In some embodiments, the bridging elements may be arranged parallel to one another and on different planes. If the plug-in direction is vertical to the viewer, the bridging elements are arranged one above the other to the viewer.

Advantageously, the contact elements each may have at least two grip regions for one bridging element each.

In some embodiments, the bridging element may have at least two gripping hands, which each fit around and electrically contact one contact element. The gripping hands each fit around a grip region of the contact element.

In at least one embodiment, a first bridging element fits around a grip region of a first contact element and a grip region of a second contact element. In this case, the grip regions of the first and second contact elements extend within a first plane (E1) parallel to the plug-in side. At the same time, a second bridging element fits around a grip region of a third contact element and a grip region of a fourth contact element. In this case, the grip regions of the third and fourth contact elements extend within a second plane (E2) parallel to the plug-in side. These planes (E1, E2) are parallel to one another and have a spacing (D) greater than zero. This means that the bridging elements are also parallel to one another and have a spacing, i.e., do not touch one another.

In some embodiments, the contact elements each may have a crimping region for electrical connection to a conductor. Crimping technology is very reliable and has advantages in particular in harsh industrial environments.

The geometric shape of the contact elements may be such that the contact elements each have, as viewed in the plug-in direction, a crimping region first, adjoined by a first grip region, which is adjoined by a second grip region. The crimping region is situated directly at the connection end of the contact element so that the plastic crimping deformations occurring here do not have any effects on the grip regions or on the bridging function.

In some embodiments, the plug connector may have a plug connector housing made of plastic. A lightweight design of the plug connector can be realized thereby. It is also advantageous if the plug connector housing and the contact insert are formed integrally together. The plug connector housing and the contact insert can be manufactured integrally in a single injection-molding process.

Advantageously, the plug connector has at least one snap-in means or device. With the aid of the snap-in means or device, the plug connector can be reversibly fastened lockably to a mating connector or a socket. Unintentional detachment of the plug connection is prevented thereby.

BRIEF DESCRIPTION OF THE SEVERAL VIEWS OF THE DRAWINGS

Embodiments of the disclosure are shown in the drawings and will be explained in more detail below.

DETAILED DESCRIPTION

The figures may contain in some cases simplified, schematic representations. Identical reference signs are sometimes used for similar but possibly non-identical, elements. Different views of similar elements might be scaled differently.

Figure 1:
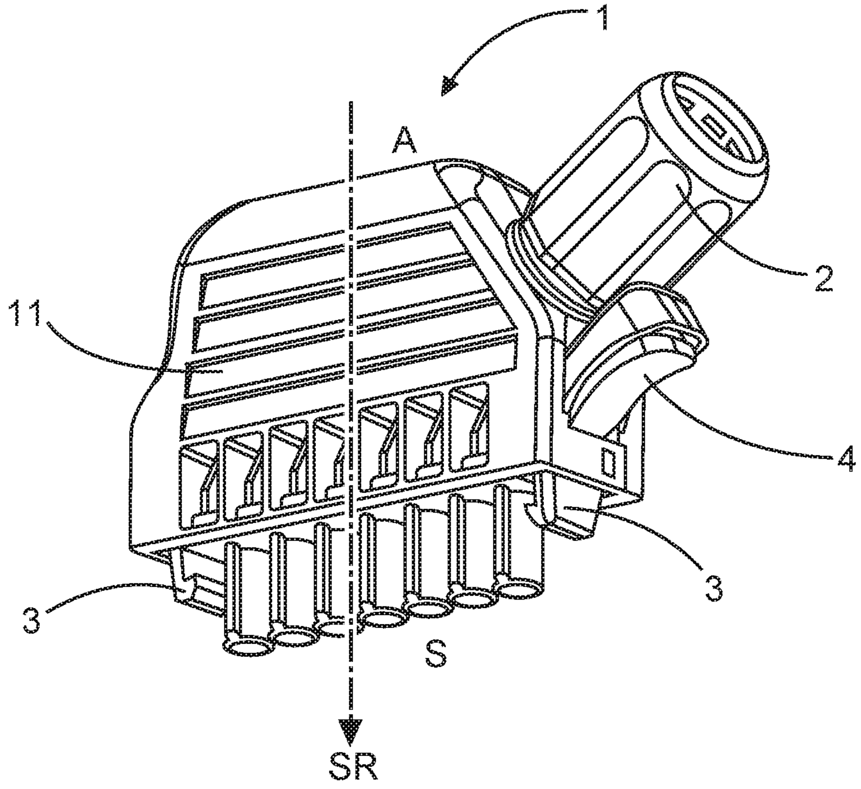
FIG. 1 shows a perspective diagram of an embodiment of a plug connector.

FIG. 1 shows a plug connector 1 according to an embodiment of the invention in a perspective diagram. The plug connector 1 has a rectangular cross section and is therefore also referred to as a rectangular plug connector. The plug connector 1 has a cable gland 2, which at the same time also forms a strain relief for a connected multi-strand cable (not shown).

The plug connector 1 has a connection side A, to which the cable or its conductors are connected, and a plug-in side S, which is guided in the plug-in direction SR to a mating connector or a socket (neither shown).

The plug connector 1 has locking hooks 3, which engage in snap-in openings provided therefor in a mating connector or a socket for reversible locking. The locking hooks 3 can correspondingly be detached again by an actuator 4 situated on the outside of the plug connector housing.

Figure 2:
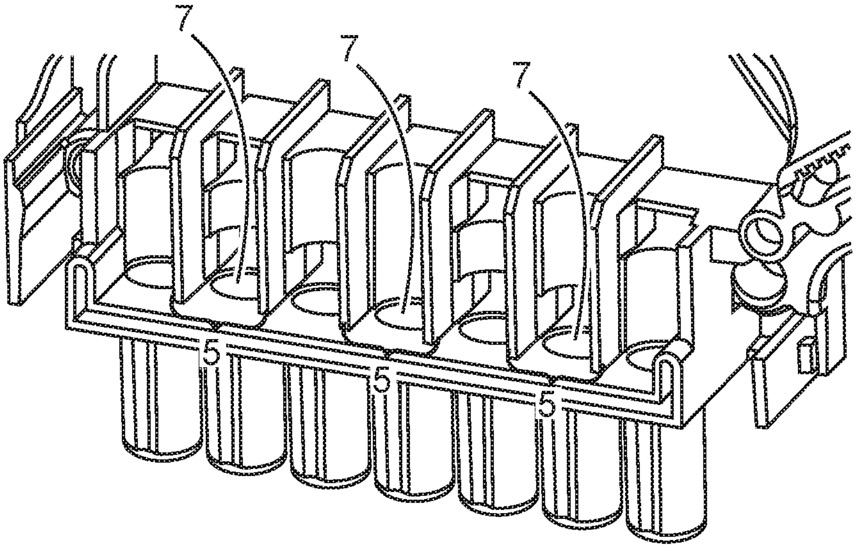
FIG. 2 shows a perspective sectional view of a portion of the plug connector without contact elements.
Figure 3:
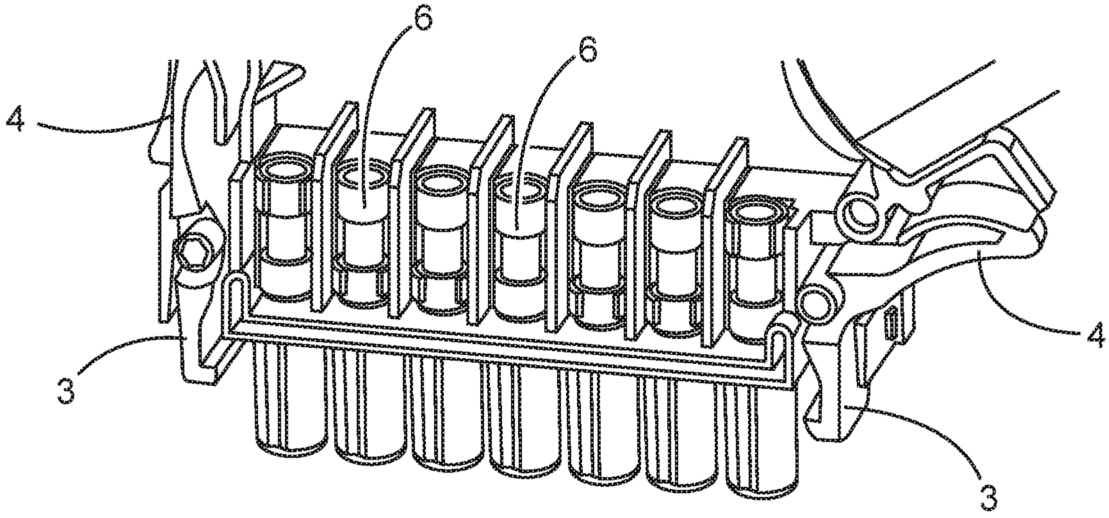
FIG. 3 shows a perspective sectional view of a portion of the plug connector with contact elements arranged therein.

In FIG. 2, the plug connector 1 is shown partially cut away. As a result, the receiving regions 5 in which the contact elements 6, 6' are arranged can be seen. In the receiving regions 5 there are openings 7 into which the contact elements 6, 6' are inserted.

Figure 6:
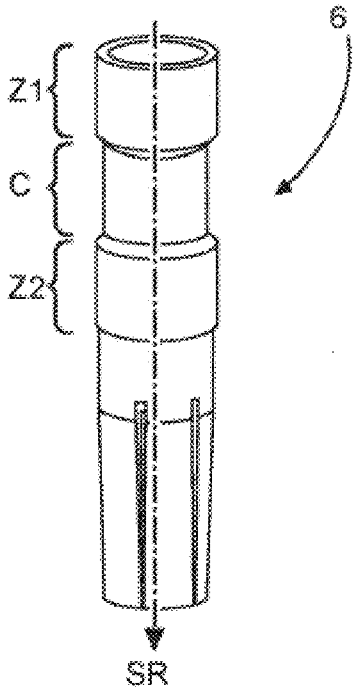
FIG. 6 shows a perspective diagram of a contact element of the plug connector.
Figure 7:
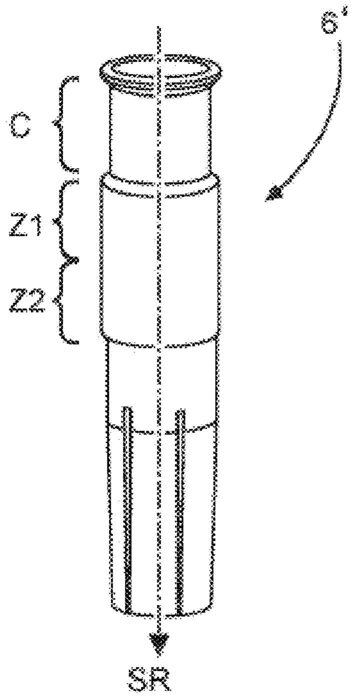
FIG. 7 shows a perspective diagram of an alternative embodiment of a contact element of the plug connector.

FIGS. 6 and 7 show embodiments of a contact element 6, 6'. The contact element 6, 6' has a crimping region C for the attachment by crimping of the conductor to be connected. Furthermore, the contact element 6, 6' has two grip regions Z1 and Z2 that can be gripped by the bridging element 10 for the electrical bridging of the contact elements 6, 6'.

Figure 5:
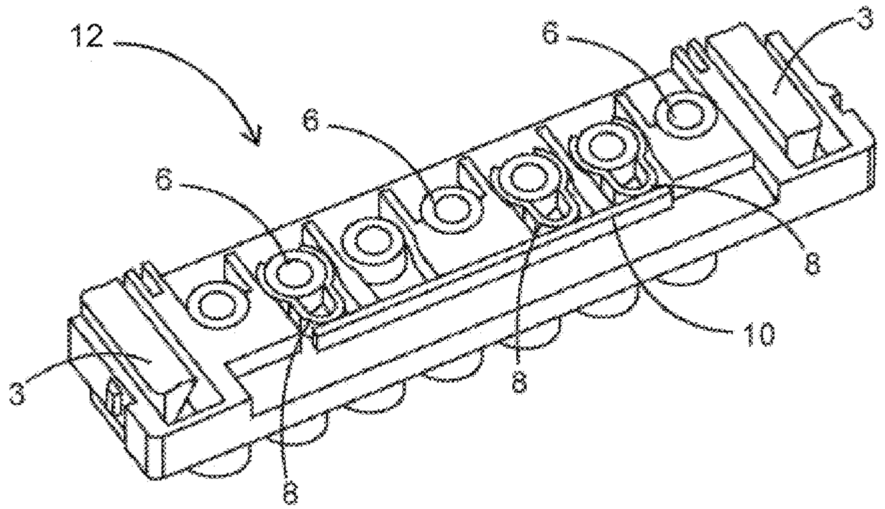
FIG. 5 shows a perspective sectional diagram of a contact insert of the plug connector.

In FIG. 5, the operating principle of a bridging element 10 can be seen easily. The bridging element 10 comprises or consists of a conductive material. The bridging element 10 has a substantially elongate strip from which multiple gripping hands 8, exactly three in the case shown, project perpendicularly. The gripping hands 8 have substantially the same operating principle as a hand of a toy brick minifigure. The gripping hands 8 each surround the grip region Z1 or Z2 of the contact element 6, 6' assigned thereto.

Figure 4:
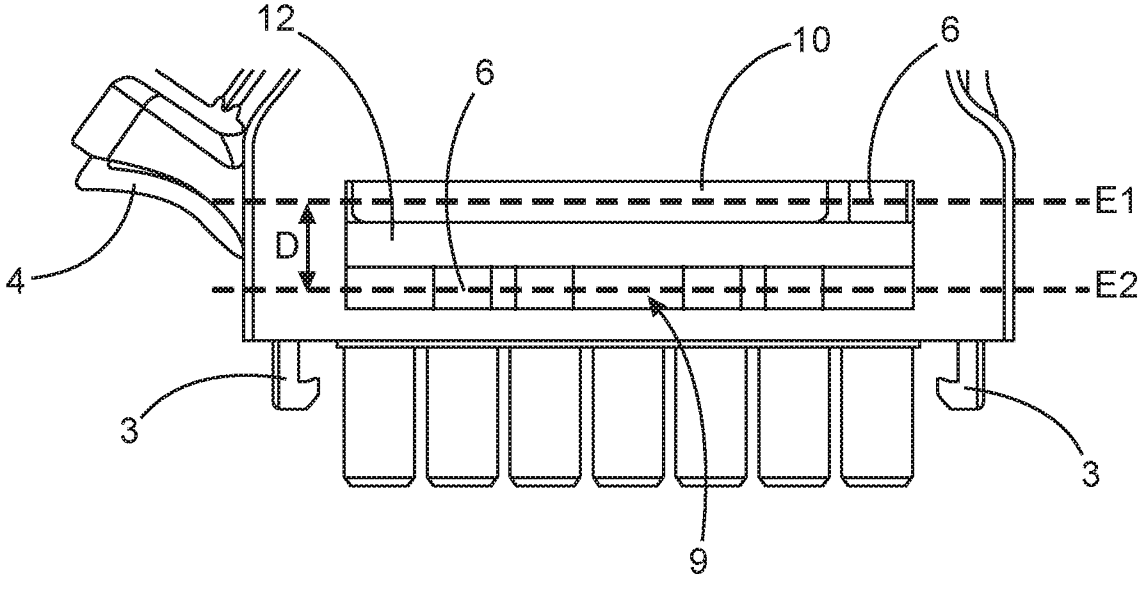
FIG. 4 shows a partially cut away side view of a portion of the plug connector.

In FIG. 4, the plug connector 1 is shown with a partially cut away plug connector housing 11 so that the viewer can see the integrated contact insert 12. The contact insert 12 has two lateral recesses 9. The bridging element 10 can be inserted laterally into the contact insert 12 into these recesses 9. In the process, the gripping hands 8 of the bridging element 10 enclose or surround the contact elements 6, 6' assigned thereto, as shown in FIG. 5. FIG. 4 shows only one bridging element 10, which is situated in a recess 9. The second recess 9 is kept free to show the viewer that it is possible to grip the contact elements 6, 6' or the grip regions Z thereof through it.

In the embodiment of the plug connector 1 in FIG. 4, a cap (not shown) is attached after the insertion of the contact bridges in order to close the open region again so that it is not touchable or accessible from the outside.

In FIG. 4, it can be seen that the bridging elements 10, if two bridging elements 10 were shown here, are arranged parallel to one another and on different planes E1, E2.

FIG. 6 shows an embodiment of a contact element 6. As viewed in the plug-in direction SR, grip regions Z1, Z2 and crimping region C alternate.

Shown in FIG. 7 is an alternative embodiment of a contact element 6'. Viewed in the plug-in direction SR, the contact element 6' has a crimping region C first, which is followed by two grip regions Z1, Z2 arranged one behind the other.

Even though various aspects or features of embodiments of the disclosure are each shown in combination in the figures, it is apparent to a person skilled in the art— unless otherwise indicated—that the combinations shown and discussed are not the only possible ones. In particular, corresponding units or feature combinations from different embodiments may be interchanged with each other. Put another way, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plug connector, comprising:

a plug-in side, a connection side, and a plug-in direction running from the connection side to the plug-in side toward a mating connector or a socket, wherein the plug connector includes a contact insert and at least four contact elements, wherein the contact elements are arranged in the contact insert in receiving regions, wherein the contact insert has at least two lateral recesses, which each extend from an exterior of the contact insert to at least some of the contact elements that are arranged in the receiving regions of the contact insert, wherein the plug connector has at least two bridging elements for the electrical connection of at least two contact elements each, wherein each of the bridging elements include an elongate structure with at least two gripping hands extending transversely from the elongate structure, each gripping hand being configured to elastically deform to engage a respective one of the contact elements, and wherein the bridging elements are arranged one behind the other as viewed in the plug-in direction, completely received within the lateral recesses of the contact insert, and offset inwardly from the exterior of the contact insert.

2. The plug connector according to claim 1, wherein the bridging elements are arranged parallel to one another and on different planes.

3. The plug connector according to claim 1, wherein the gripping hands each fit around a grip region of a respective contact element.

4. The plug connector according to claim 1, wherein:

a first bridging element fits around a grip region of a first contact element and a grip region of a second contact element, wherein the first grip regions of the first and second contact elements extend within a first plane parallel to the plug-in side, and a second bridging element fits around a grip region of a third contact element and a grip region of a fourth contact element, wherein the grip regions of the third and fourth contact elements extend within a second plane parallel to the plug-in side, wherein the first and second planes are parallel to one another and have a spacing that is greater than zero.

5. The plug connector according to claim 1, wherein the contact elements each have a crimping region for electrical connection to a respective conductor.

6. The plug connector according to claim 1, wherein the contact elements each have, as viewed in the plug-in direction, a crimping region first, adjoined by a first grip region of the at least two grip regions, which is adjoined by a second grip region of the at least two grip regions.

7. The plug connector according to claim 1, wherein the plug connector has a plug connector housing made of plastic.

8. The plug connector according to claim 7, wherein the plug connector housing and the contact insert are formed integrally together.

9. The plug connector according to claim 1, wherein the plug connector has at least one snap-in device with which the plug connector is reversibly lockable to the mating connector or the socket.

* * * * *